G. H. OBER.
WOOD TURNING LATHE.
No. 48,428. Patented June 27, 1865.
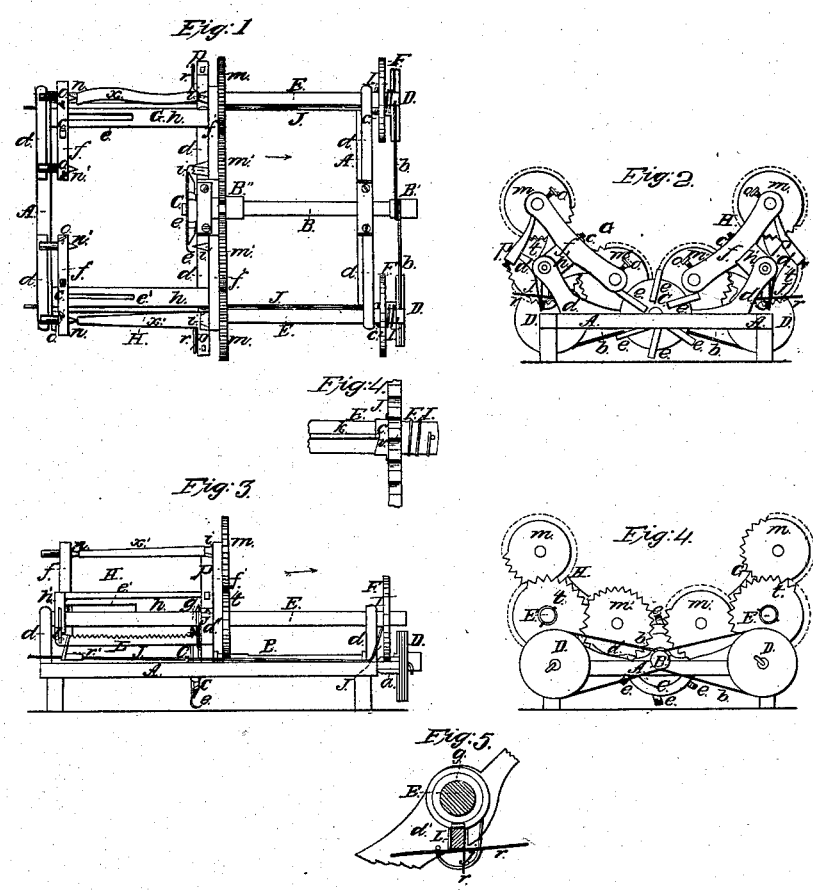

UNITED STATES PATENT OFFICE.

G. H. OBER, OF NEWBURG, OHIO.

IMPROVEMENT IN WOOD-TURNING LATHES.

Specification forming part of Letters Patent No. 48,428, dated June 27, 1865.

*To all whom it may concern:*

Be it known that I, G. H. OBER, of Newburg, in the county of Geauga and State of Ohio, have invented certain new and useful Improvements in Lathes for Turning Irregular Forms; and I do hereby declare that the following is a full and complete description of the construction and operation of the same, reference being had to the accompanying drawings, making a part of this specification, in which—

Figure 1 is a plan view of the lathe. Fig. 2 is an end elevation. Fig. 3 is a side view. Fig. 4 is a view of the end opposite from Fig. 2. Figs. 5 and 6 are detached sections.

Like letters of reference refer to like parts in the different views.

My improvement relates to the manner of constructing and operating a lathe-machine for turning irregular forms, as hereinafter described.

A represents the frame of the machine, suitably constructed for the operating parts.

B is a shaft supported and turning in the frame, on one end of which is a cutter-head, C, that curved knives or cutters are attached to on one side, projecting around the periphery, as shown in the drawings. On the outer end of the shaft B is a pulley, B', which carries the belts b b, which belts pass around the pulleys D D, (one around each,) thus communicating motion from the shaft B to other parts of the machine.

E E are shafts supported and running in standards d d', secured on the frame at each end and in the middle. On one end of these shafts are gear-wheels F F, that work in pinions a on the shafts of the pulleys D, whereby the shafts E are revolved.

G and H are moving frames or carriages connected to the shafts E, that are alike in their construction and operation, and the different parts of each being referred to by the same letters of reference, describing the construction and operation of one answers for the description of the other. Each carriage consists of arms f f', between which extends a cross-piece, h, that is permanently secured at one end to the middle of the arm f', and in the other end is a slot, e', which, by means of a set-screw, c, the arm f is fastened to it, whereby the arm f can be adjusted up nearer or farther from the arm f'. The arm f' extends down so that the shaft E passes through it, and from the other end of the cross-piece h extends down an arm, h', through which the shaft likewise passes, connecting the carriage to the shaft. Underneath the shaft, and connected to one end of the carriage, is a rack, L, that is hung, by a bail, l, extending up around the shaft, in a slot in the arm h', that keeps it in place. In this rack works an endless screw, g, on the shaft E, that moves the rack along with the carriage as the shaft E revolves. The rack L is held in a position parallel to the shaft E by means of a slot in the under part of the standard d' and by means of the lever r, which is pivoted to one side of the arm d'. This lever r is held in place by the catch j when the rack is in gear with the endless screw g, but it can be released at pleasure, allowing the rack to fall out of gear. Fig. 5 shows an enlarged view of this part of the machine. On the rack is hung an adjustable stop, r', which is so arranged that as the rack is moved along, conveying the carriage the desired distance, it comes against the catch j and moves it from under the lever, when the lever drops down with the rack, putting the rack out of gear with the screw. On the outside of the arm f' are gear-wheels m m', that turn on wrists extending through the ends of the arm, forming dogs i on the inside. The wrists are secured to the gear-wheels and turn with them, by which the pattern and wood that is to be formed is turned.

Directly opposite the dogs i, in the arm f, are centers n n', that are adjusted by screws o. Between the centers and dogs are held the pattern and wood that is to be cut into a form, the pattern being on the outside of the carriage and the piece of wood to be formed on the inside, so as to be brought in contact with the cutter-head.

The wheels m m' are revolved by a gear-wheel, t, that turns with the shaft E by means of a feather-key in the eye of the wheel, fitting into a slot, k, (seen in Fig. 4,) in the shaft E, whereby the wheel can be turned, and at the same time allows it to be moved either way on the shaft.

p is an arm secured on the end of the middle standard, d', that the pattern, as it is held in the carriage, rests and turns against.

The carriages G and H, constructed and operating alike, are arranged on the frame each side of the cutter-head, so that forms of the same or different kinds can be turned in each of them at the same time with one operation. The pattern of an ax-handle, or any analogous form, as seen at $x$ and $x'$ in Fig. 1, is placed in the carriage, between the outside dog and center $n$, resting and turning against the arm $p$, being turned by the revolution of the gear-wheel $m$, and between the center $n'$ and dog $i'$ is secured the wood that is to be cut into the form of the pattern, which is turned round in the same manner as the pattern by the gear-wheel $m'$. The carriage is in such a position as to bring the wood in contact with the revolving cutter-head, as in Fig. 2, for as the pattern rests against the stationary arm $p$ it turns and is moved along from one end to the other, and will bring the wood more or less against the cutters, according to the form of the pattern, lengthwise and across, causing the wood to be turned into the exact form of the pattern. The wood to be thus formed and pattern are of the same length, and the distance between the arms can be adjusted by means of the slot $e$, as before stated, to suit the length of any pattern and form to be turned. The carriage is moved along in the direction of the arrow in Figs. 1 and 3, turning the form from the butt to the point by the shaft E, revolving which turns the screw $g$ in the rack, and the stop $r'$ can be so adjusted that when the carriage is moved along so as to complete the form, whether long or short, the stop will disengage the lever, so that the rack will drop down out of gear, when the carriage can be moved back on the shaft.

J is a shifter extending along the frame and turning up against the inside of the wheel F, and clasps partly around a clutch, $c'$, which is represented enlarged in Fig. 4. This clutch is connected to the wheel and catches on wrists $v$ in the shaft, and by the action of a spring, I, around the shaft on the wheel the clutch is held in contact with the wrists, so as to revolve the shaft, and by means of the shifter the wheel can be moved along so as to disengage the clutch, stopping the revolution of the shaft and gear-wheels connected to the carriage.

What I claim as my improvement, and desire to secure by Letters Patent, is—

1. The rack L, stop $r'$, and shaft E, in combination with the lever $r$, catch $j$, screw $g$, and adjustable carriage G or H, substantially as and for the purpose set forth.

2. The special arrangement of the spring I, clutch $c'$, and shifter J, in combination with the shaft E and adjustable carriage G or H, as herein described, for the purposes set forth.

G. H. OBER.

Witnesses:
W. H. BURRIDGE,
A. W. McCLELLAND.